Feb. 17, 1970 C. A. ALFSEN ETAL 3,495,519

XY TABLE

Filed Feb. 1, 1967 2 Sheets-Sheet 1

INVENTORS
CHRISTIAN A. ALFSEN
THOMAS P. BLUITT
BY Darby & Darby
ATTORNEYS

XY TABLE

Filed Feb. 1, 1967 2 Sheets-Sheet 2

INVENTORS
CHRISTIAN A. ALFSEN
THOMAS P. BLUITT
BY Darby & Darby
ATTORNEYS

United States Patent Office 3,495,519
Patented Feb. 17, 1970

3,495,519
XY TABLE

Christian A. Alfsen, East Northport, and Thomas P. Bluitt, Blue Point, N.Y., assignors, by mesne assignments, to Microform Data Systems, Inc., a corporation of Delaware Filed Feb. 1, 1967, Ser. No. 613,175
Int. Cl. G03b 27/62
U.S. Cl. 95—36 4 Claims

ABSTRACT OF THE DISCLOSURE

An XY table comprises a pair of opposing base angles in which two stationary parallel lower guide rods are adjustably supported. Two bearing blocks ride on each of these lower guide rods and carry two parallel upper guide rods, which are perpendicular to the lower guide rods, for movement in the Y direction. Two additional bearing blocks ride on each of the upper guide rods along the X axis and a removable registration plate is supported on top of the four upper bearing blocks so that the plate is movable in both the X and Y directions. Accurate alignment of the registration plate is provided by an eccentric screw which cams the plate about a fixed pivot point so that it can be properly aligned before it is securely fastened to the upper bearing blocks.

RELATED APPLICATIONS

The XY table of the present invention is intended specifically for use as the XY table in the microimage viewer illustrated and described in U.S. patent application No. 472,498 filed July 16, 1965, now Patent No. 3,361,031, in the name of James W. Stroud and assigned to the assignee of this application.

BACKGROUND OF THE INVENTION

An XY table as a term of art refers to a device which may be positioned with respect to two rectangular coordinates, e.g., the X and Y axes. Such devices are common and have a wide variety of uses throughout industry. As a specific example, in the above-mentioned application No. 472,498, an XY table is used to position one of a multitude of microimages arranged in an XY matrix in the optical readout path of a microimage viewer.

Conventionally, an XY table consists of a stationary base plate and a rectangular frame which may be moved with respect to the base plate along one of the axes. A second plate or table is mounted on the bottom plate so as to be movable with respect thereto along the other axis. Hence, by positioning the upper and lower tables it is possible to accurately position the upper table with respect to both the X and Y axes.

In the prior art, and particularly where precision is important, such XY tables are relatively heavy and, moreover, limited to use with a particular case matrix. The present invention alleviates these drawbacks without sacrificing precision.

SUMMARY

Briefly, in accordance with the invention, a plurality of lower bearing blocks, mounted on suitable guide members, are movable along one of two transverse axes. Additional guide members are mounted in these bearing blocks and upper bearing blocks are mounted on such additional guide members and adapted to move along the other axis. A removable top plate is attached to the upper bearing blocks so that a matrix mounted thereon can be accurately positioned along both the X and Y axes.

DESCRIPTION OF THE PREFERRED EMBODIMENTS

In the preceding and following description, and in the claims, the term XY table is used as a term of art and is not intended to imply movement with respect to particular axes, i.e., horizontal or vertical. The invention is designed primarily to provide movement in a horizontal plane but would obviously not be so limited. Thus, the terms X and Y axes when they appear are used merely as a frame of reference to indicate mutually perpendicular axes.

Two opposing L-shaped base angles 10 and 12 are secured in any suitable fashion within the housing (not shown) of the apparatus in which the XY table is to be used. Each base angle 10 and 12 includes rear and front vertical mounting portions **10*a*, 10*b*, and 12*a*, 12*b*, respectively. A pair of lower horizontal guide rods 14 and 16 are secured in mounting portions 10*a* and 12*a*, and 10*b* and 12*b*, respectively, by nuts 18. The manner in which the lower guide rods 14 and 16** are accurately aligned is explained in detail below with reference to FIG. 3.

Figure 4:
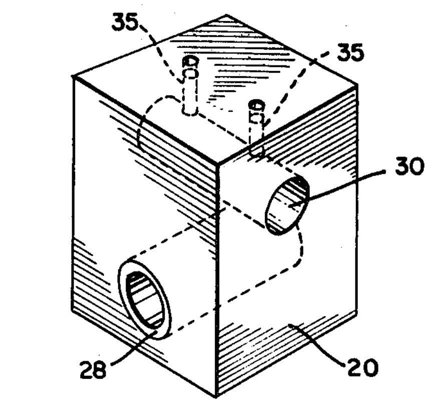
FIGURE 4 is a perspective view of a lower bearing block according to the invention.

A first pair of lower bearing blocks 20 and 22 ride on lower guide rod 14 and a second pair of lower bearing blocks 24 and 26 ride on the guide rod 16. Each of the bearing blocks 20, 22, 24 and 26 contains a standard Thomson linear bearing 28 (see FIG. 4) as the low friction support means for the respective guide rods 14 and 16. Any bearing means may be used in place of bearing 28.

Each of the aforementioned lower bearing blocks further contains an upper bore 30 into which is inserted one of two upper guide rods 32 or 34. The rods 32 and 34 are perpendicular to the lower guide rods 14 and 16 and are retained in bores 30 by pairs of set screws 35.

Figure 5:
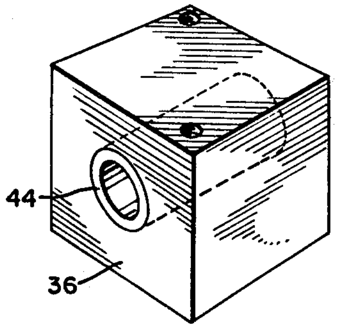
FIGURE 5 is a perspective view of an upper bearing block according to the invention.
Figure 6:
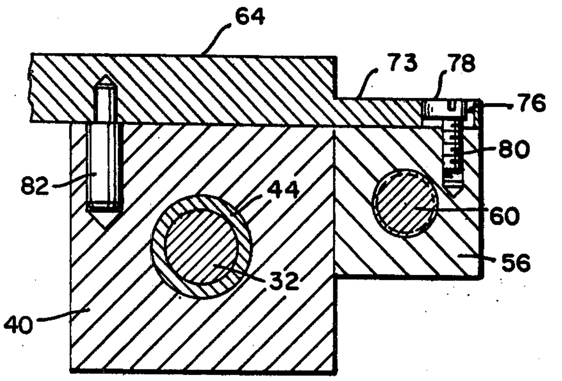
FIGURE 6 is a detailed view of the plate alignment structure of the invention.

Two additional upper bearing blocks 36 and 38 slide on guide rod 34 and a second pair of upper bearing blocks 40 and 42 similarly slide on the upper guide rod 32. Bearing blocks 36, 38, 40 and 42 are shown in FIG. 5 in detail and also include a linear bearing 44 for contact with the associated guide rod 32 or 34.

The bearing block 24 is elongated and threadedly receives lead nut 46 in threaded engagement with a lead screw 48 suitably journalled in the vertical mounting portion **10*b* of base angle 10. A standard bearing 50 may be inserted in mounting portion 10*b* to receive the end of screw 48, which is driven by a flexible drive shaft 52 in turn connected to the output of a motor (not shown). In a similar fashion, the upper bearing block 40 is formed with an extension 56 into which is threaded a lead nut 58 in threaded engagement with a second lead screw 60 connected to a flexible shaft 62 adapted to be driven by a second motor (not shown). The external threads of nuts 46 and 58 may differ slightly from their internal threads (and the thread of screws 48 and 60**) to provide a very fine differential alignment as explained below.

A flat rectangular registration plate 64 is mounted on top of the upper bearing blocks 36, 38, 40 and 42 by pairs of diagonally opposed screws 66 and 68 passing through oversized holes in plate 64 into threaded engagement with the respective bearing blocks. The plate 64 contains a square central opening 70 having a peripheral rim 72 in which, for example, the microimage matrix can be rested.

A lug 73 extends from 64 immediately above the extension 56 of bearing block 40. Lug 73 contains a circular counterbore 76 adapted to engage the eccentric head 78 of a screw 80 which is in threaded engagement with the block 56. A dowel 82 extends vertically downwardly from plate 64 into a tight-fitting bore within the block 40 so that when the screw 80 is rotated the camming effect of the eccentric head 78 on the counterbore 76 causes a slight pivotal movement of the entire plate 64 about dowel 82, thereby permitting accurate alignment of the plate 64 with respect to the reference X and Y axes. A pair of screws 66' and 68' clamp plate 64 to the bearing block 40. The screws 66, 66' and 68, 68' should fit loosely enough through plate 64 to permit .01 to .1 inch of movement with the heads of the screws clamping the plate to the upper bearing blocks when the screws are tightened.

To align registration plate 64, the screws 66, 68 (and 66', 68') are inserted into their respective bearing blocks and then hand-tightened. The desired XY reference axes are accurately determined in any desired fashion and the screw 80 is then adjusted until the plate 64 is properly aligned with respect to the reference axes. Thereafter, screws 66, 66' and 68, 68' are tightened to clamp plate 64 to blocks 36, 38, 40 and 42. The diagonal arrangement of the various screws 66 and 68 facilitates the slight pivotal movement of plate 64 and therefore helps to properly align the plate.

Figure 3:
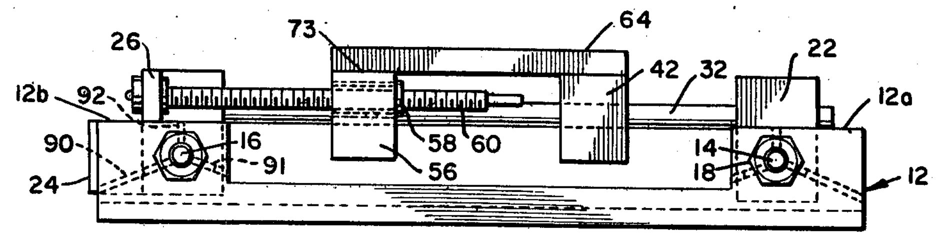
FIGURE 3 is a side view of the XY table of FIG. 1.

FIG. 3 illustrates the structure by which accurate horizontal parallel alignment of the bottom guide rods 14 and 16 is assured. For this purpose, three set screws 90, 91 and 92 pass through each of mounting portions **10*a*, 10*b*, 12*a* and 12*b* of the base angles 10 and 12 into engagement with each of the rods 14 and 16 at the opposite ends thereof. By carefully adjusting each set of screws 90, 91 and 92, the guide rods 14 and 16** may be accurately aligned in a horizontal plane and with respect to each other.

The lead screws 48 and 60 and lead nuts 46 and 58, respectively, may be adjustable to better than one ten-thousandth of an inch. For example, the threads on the lead screws may be 10–40 or a lead of .025. The lead nuts may also be threaded on the outside with .562 x 24 threads or a lead of .0425. Thus, by turning the lead nuts in or out of their respective mounting lugs, the table may be advanced or rethreaded by .0175 per turn of the lead nut. The differential of the lead of the two threads, .025 and .0425 produces an infinite number of fine adjustments. This adjustment can assure that a desired frame in a matrix is precisely positioned. In said application No. 472,498 the magnification is on the order of 250×, and a misalignment of .001 of the frame will result in misalignment of .250 on the screen. Hence, there is a need for this exceedingly fine adjustment.

Figure 1:
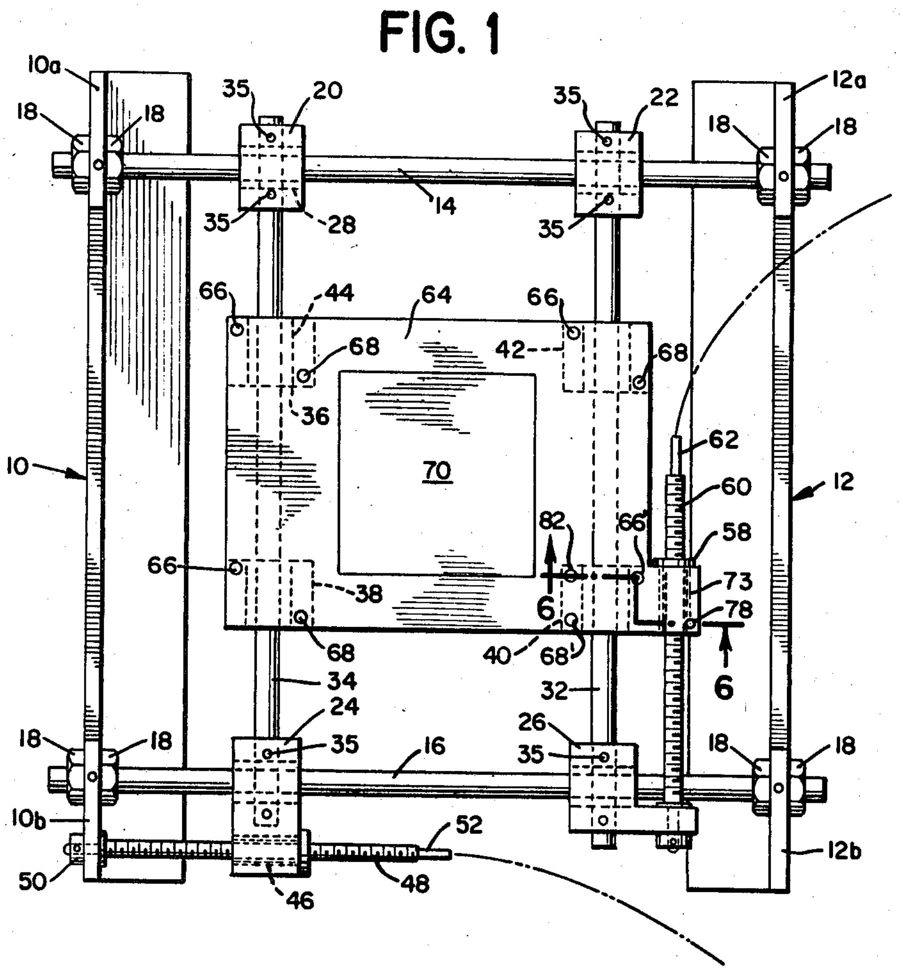
FIGURE 1 is a top view of an XY table according to the invention.

The operation of the invention should be self-evident from the preceding description. When drive screw 48 is rotated, bearing block 24 (with all other bearing blocks and plate 64) is driven along the left-right axis of FIG. 1. Rotation of screw 60 moves the blocks and plate along the top-bottom axis of FIG. 1. Hence, any point on a matrix supported on rim 72 of plate 64 can be positioned at a particular point, e.g., the center of the table.

It is relatively easy to employ a registration plate of a different size from that of plate 64 in accordance with the invention. Thus, the base angles may be released from their base support and each of the set screws 90, 91, 92 and bolts 18 loosened. The base angles may then be separated by whatever distance is necessary to assure full movement of the new plate over the entire XY range. If necessary, new guide rods may be inserted into more widely spaced mounting holes (not shown) in base angles 10 and 12 to increase both dimensions of the table. The new plate may then be substituted for the old plate 64 and properly aligned as explained above.

Although such flexibility is an important advantage of the present invention, the most significant achievement is in providing a high precision XY table having a large reduction in weight. By way of example, in a practical embodiment, this construction of the invention has enabled a weight reduction from twenty-one pounds to approximately twenty-eight ounces.

Figure 2:
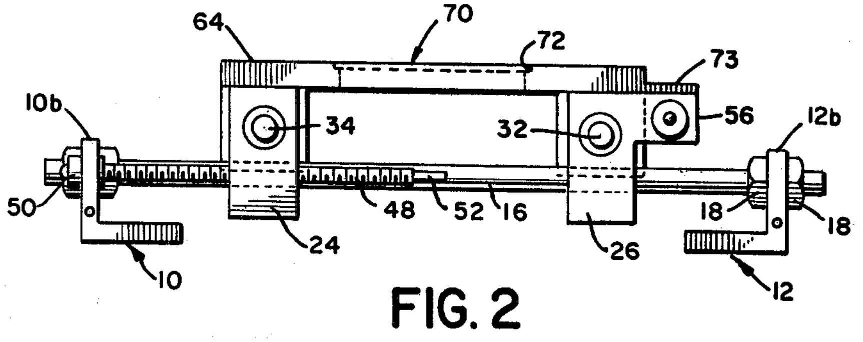
FIGURE 2 is an end view of the XY table of FIG. 1.

Although a preferred embodiment of the invention has been illustrated and described, the invention is not necessarily so limited and other modifications thereof will be obvious to those skilled in the art. Specifically, the particular means by which the bearing blocks are moved is not a feature of the invention. Conceivably, a single screw could be used in place of the separate guide rod and driving screw illustrated in FIGS. 1 to 3 with, of course, necessary changes being made in the bearing construction to provide a low-friction contact. Similarly, standard constructions may be substituted for the illustrated bearing blocks and adjusting means which accurately aligns the registration plate. Of course, the specific system or environment in which the invention is used is not material. Accordingly, the invention should not be limited except as defined in the following claims.

What is claimed is:

1. An adjustable XY table comprising: support means including a pair of lower, spaced apart, parallel guide members, a first table portion for movement in the X direction, the first portion comprising a pair of spaced apart lower bearing blocks slidably disposed on each lower guide member, and a pair of upper, spaced apart guide members connected to the lower bearing blocks and positioned perpendicular to the lower guide members, and a second table portion mounted to the first portion, movable with the first portion in the X direction and movable along the upper guide members in the Y direction, the second portion comprising a pair of independent upper bearing blocks slidably disposed on each upper guide member, a plate placed over the upper bearing blocks and having openings overlying the blocks, and releasable fasteners demountably securing the plate to the upper bearing blocks, the fasteners extending through the openings and having a cross-section permitting relative motions between the blocks and the plate when the fasteners are loosened so that the orientation of the plate relative to the X and Y directions is adjustable.

2. An XY table according to claim 1, including aligning means for camming said plate about a fixed axis with respect to said upper bearing blocks.

3. An XY table according to claim 2 wherein said fasteners comprise diagonally opposed screws for securing said plate to the tops of said upper bearing blocks.

4. An XY table according to claim 1, wherein each of said driving means comprises respective lead screws in threaded engagement with externally threaded lead nuts threadedly received in said one lower bearing block and said one upper bearing block, the internal threads of said lead nut differing from the external threads thereof.

References Cited

UNITED STATES PATENTS

| | | |
|---|---|---|
| 2,941,136 | 6/1960 | Marantette. |
| 3,267,801 | 8/1966 | Abbott. |
| 3,361,031 | 1/1968 | Stroud. |

JOHN M. HORAN, Primary Examiner

L. H. McCORMICK, Jr., Assistant Examiner

U.S. Cl. X.R.

33—1; 353—24